(12) United States Patent
Sun et al.

(10) Patent No.: US 11,711,816 B2
(45) Date of Patent: Jul. 25, 2023

(54) CONTROL PHYSICAL DOWNLINK SHARED CHANNEL FOR ADDITIONAL CONTROL CAPACITY

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 17/164,660

(22) Filed: Feb. 1, 2021

(65) Prior Publication Data

US 2022/0248452 A1 Aug. 4, 2022

(51) Int. Cl.
*H04W 48/02* (2009.01)
*H04W 72/23* (2023.01)

(52) U.S. Cl.
CPC ........... *H04W 72/23* (2023.01); *H04W 48/02* (2013.01)

(58) Field of Classification Search
None
See application file for complete search history.

(56) References Cited

U.S. PATENT DOCUMENTS

| | | | | |
|---|---|---|---|---|
| 10,291,378 | B1* | 5/2019 | Bai | H04L 1/0016 |
| 10,674,550 | B2* | 6/2020 | Kim | H04W 24/08 |
| 2014/0219232 | A1* | 8/2014 | Takeda | H04W 72/23 |
| | | | | 370/329 |
| 2020/0022144 | A1* | 1/2020 | Papasakellariou | H04W 72/23 |
| 2020/0163155 | A1* | 5/2020 | Lee | H04L 5/0053 |
| 2020/0396759 | A1* | 12/2020 | Baldemair | H04L 1/1854 |
| 2022/0201726 | A1* | 6/2022 | Papasakellariou | H04L 5/0098 |

* cited by examiner

*Primary Examiner* — Hong S Cho
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive a physical downlink control channel (PDCCH) communication including first downlink control information (DCI) that grants resources for a dedicated control physical downlink shared channel (PDSCH) communication. The UE may receive the dedicated control PDSCH communication, wherein the dedicated control PDSCH includes second DCI. Numerous other aspects are described.

30 Claims, 8 Drawing Sheets

CONTROL PHYSICAL DOWNLINK SHARED CHANNEL FOR ADDITIONAL CONTROL CAPACITY

FIELD OF THE DISCLOSURE

Aspects of the present disclosure generally relate to wireless communication and to techniques and apparatuses for a control physical downlink shared channel (PDSCH) for additional control capacity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a physical downlink control channel (PDCCH) communication including first downlink control information (DCI) that grants resources for a dedicated control physical downlink shared channel (PDSCH) communication; and receiving the dedicated control PDSCH communication, wherein the dedicated control PDSCH includes second DCI.

In some aspects, a method of wireless communication performed by a base station includes transmitting a PDCCH communication including first DCI that grants resources for a dedicated control PDSCH communication; and transmitting the dedicated control PDSCH communication, wherein the dedicated control PDSCH includes second DCI.

In some aspects, a UE for wireless communication includes a memory and one or more processors operatively coupled to the memory, the memory and the one or more processors configured to: receive a PDCCH communication including first DCI that grants resources for a dedicated control PDSCH communication; and receive the dedicated control PDSCH communication, wherein the dedicated control PDSCH includes second DCI.

In some aspects, a base station for wireless communication includes a memory and one or more processors operatively coupled to the memory, the memory and the one or more processors configured to: transmit a PDCCH communication including first DCI that grants resources for a dedicated control PDSCH communication; and transmit the dedicated control PDSCH communication, wherein the dedicated control PDSCH includes second DCI.

In some aspects, a non-transitory computer-readable medium storing a set of instructions for wireless communication includes one or more instructions that, when executed by one or more processors of a UE, cause the UE to: receive a PDCCH communication including first DCI that grants resources for a dedicated control PDSCH communication; and receive the dedicated control PDSCH communication, wherein the dedicated control PDSCH includes second DCI.

In some aspects, a non-transitory computer-readable medium storing a set of instructions for wireless communication includes one or more instructions that, when executed by one or more processors of a base station, cause the base station to: transmit a PDCCH communication including first DCI that grants resources for a dedicated control PDSCH communication; and transmit the dedicated control PDSCH communication, wherein the dedicated control PDSCH includes second DCI.

In some aspects, an apparatus for wireless communication includes means for receiving a PDCCH communication including first DCI that grants resources for a dedicated control PDSCH communication; and means for receiving the dedicated control PDSCH communication, wherein the dedicated control PDSCH includes second DCI.

In some aspects, an apparatus for wireless communication includes means for transmitting a PDCCH communication including first DCI that grants resources for a dedicated control PDSCH communication; and means for transmitting the dedicated control PDSCH communication, wherein the dedicated control PDSCH includes second DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
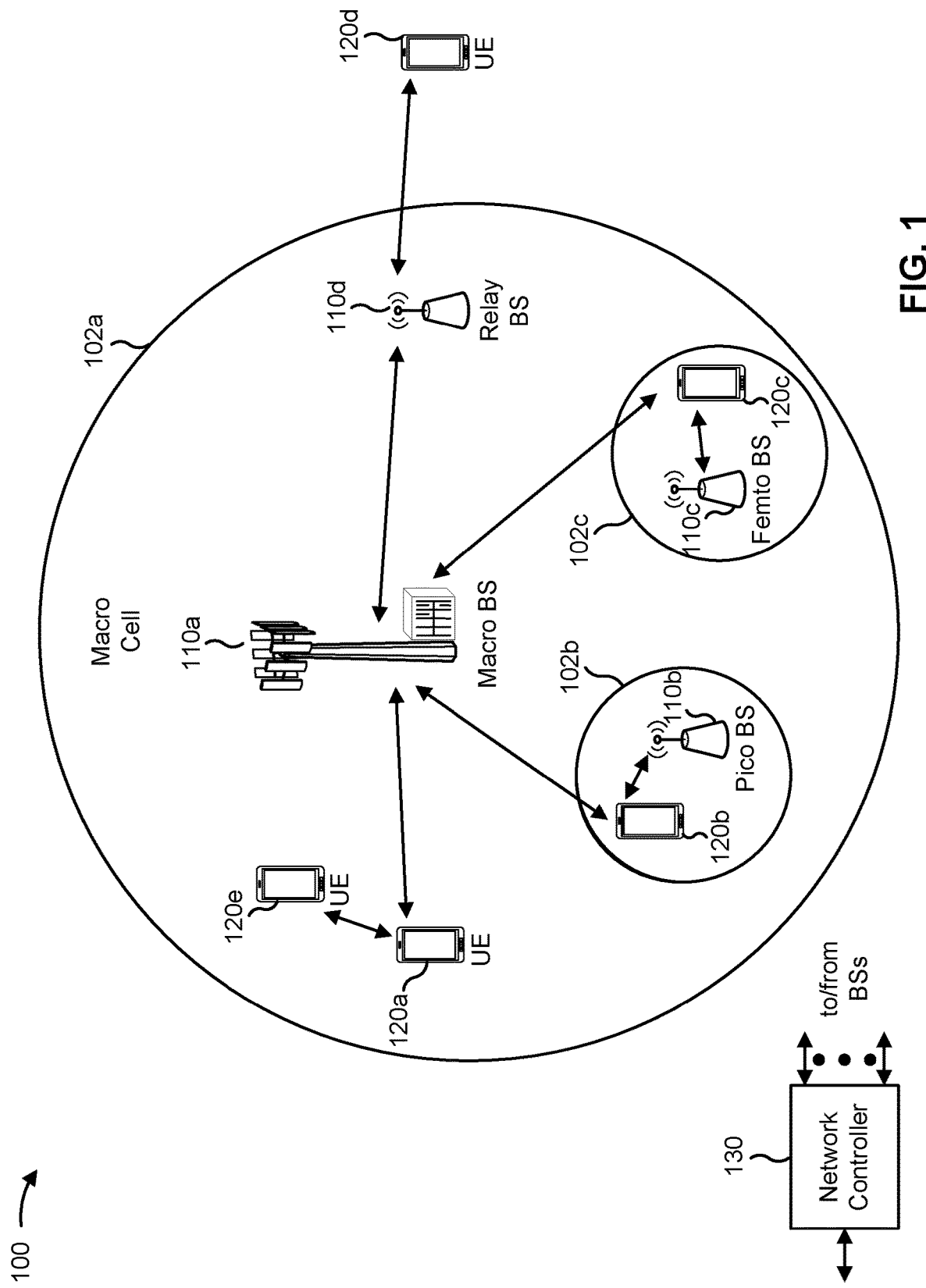
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
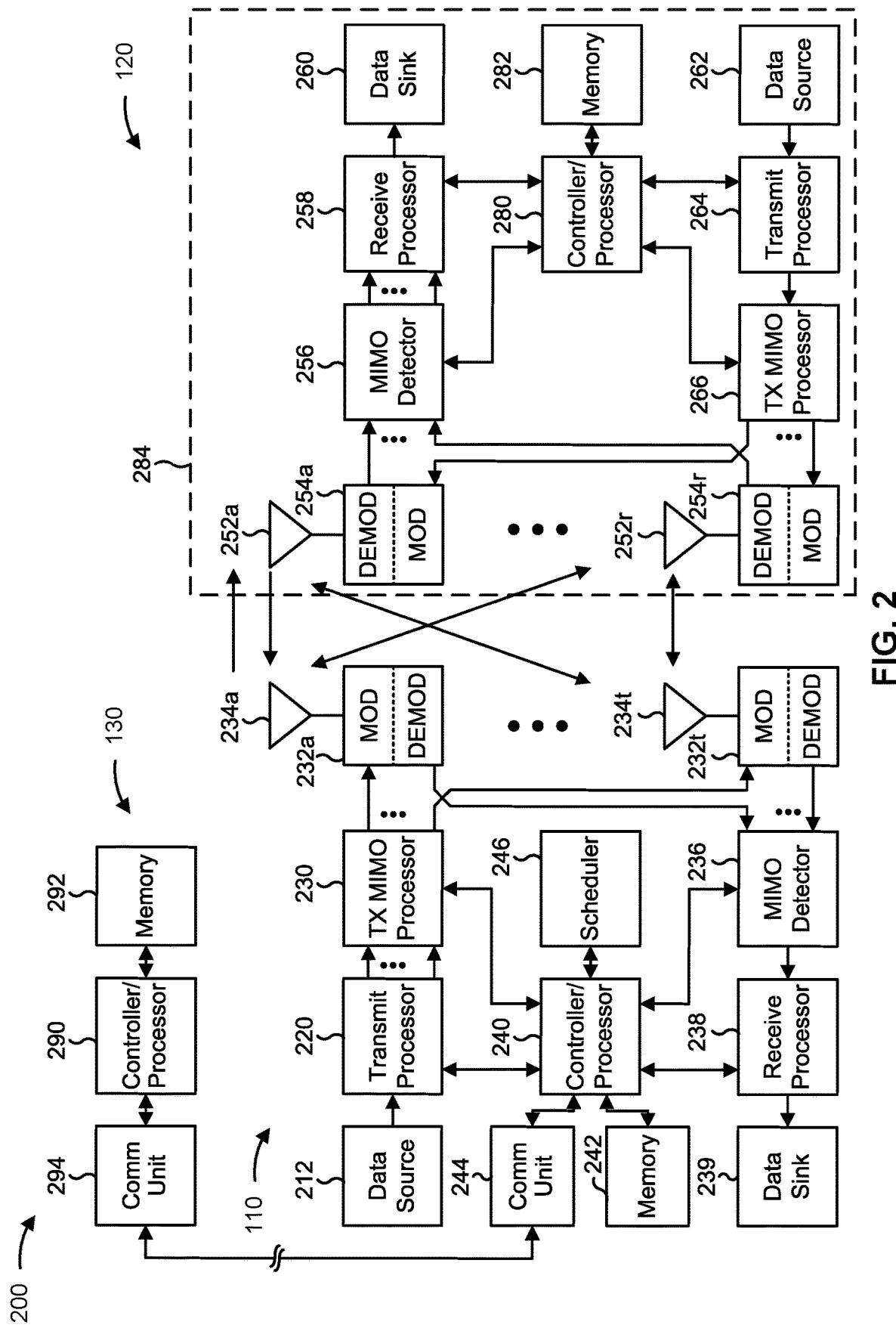
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with a control physical downlink shared channel (PDSCH) for additional control capacity, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving a physical downlink control channel (PDCCH) communication including first downlink control information (DCI) that grants resources for a dedicated control PDSCH communication, means for receiving the dedicated control PDSCH communication, wherein the dedicated control PDSCH includes second DCI, or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, or the like.

In some aspects, base station 110 may include means for transmitting a PDCCH communication including first DCI that grants resources for a dedicated control PDSCH communication, means for transmitting the dedicated control PDSCH communication, wherein the dedicated control PDSCH includes second DCI, or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
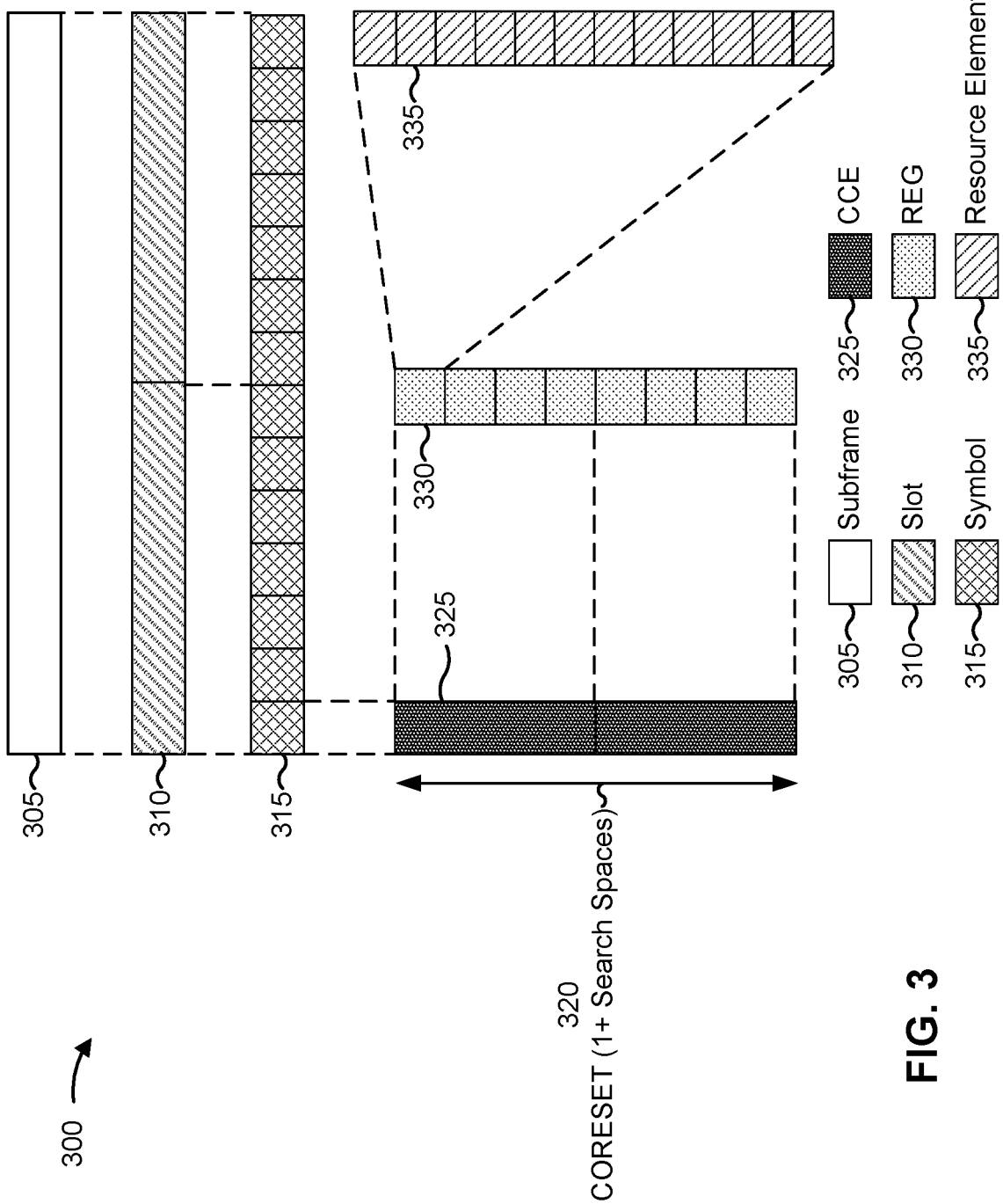
FIG. 3 is a diagram illustrating an example 300 of physical channels and reference signals in a wireless network, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more PDSCHs. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include DCI that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. An REG 330 may include one resource block, which may include 12 resource elements (REs) 335 within a symbol 315. An RE 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORE-SET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

As described above, DCI is typically transmitted to a UE from a base station in a PDCCH transmission using a CORESET. For example, the base station may transmit DCI in a PDCCH communication to schedule an uplink or a downlink grant for the UE. This may involve blind decoding, in which the UE may decode multiple PDCCH candidates until a PDCCH for the UE is discovered. In some cases, such as when a base station serves a large number UEs, there may be insufficient capacity in the CORSET for a UE to receive DCI. This may result in uplink or downlink grants being delayed for the UE. Furthermore, in such cases, the base station may transmit a large number of PDCCH communications, leading to the UE performing a large number of blind decodings, which may result in excessive power consumption by the UE.

In some cases, DCI may be multiplexed together with data in a PDSCH communication. This is referred to as "piggyback DCI" or "piggybacked DCI." A piggyback DCI may include one or more DCI communications. Although piggyback DCI may increase the control capacity (e.g., the capacity for transmission of DCI) in a TTI, the control capacity may still be limited due to multiplexing the DCI with data in the PDSCH communication. Furthermore, piggyback DCI may be encoded using polar code, and decoding the piggyback DCI may count towards a control decoding capacity (e.g., a number of CCEs for which channel estimation can be performed and/or a number of blind decodings) for a UE.

Some techniques and apparatuses described herein enable a dedicated control PDSCH communication for transmitting control information (e.g., DCI) from a base station to one or more UEs. In some aspects, a UE may receive a PDCCH communication including first DCI that grants resources for a dedicated control PDSCH communication. The UE may receive the dedicated control PDSCH, and the dedicated control PDSCH may include second DCI for the UE, and possibly for one or more other UEs. The second DCI may be transmitted in the payload of the dedicated control PDSCH. As a result, a capacity for transmitting DCI may be increased as compared to piggyback DCI. Furthermore, the second DCI is transmitted in the payload of the dedicated control PDSCH, and the second DCI may be encoded using low-density parity check (LDPC) code. Thus, decoding the second DCI may not be counted towards a control decoding capacity of a UE. Furthermore, resources for the dedicated control PDSCH are granted by the first DCI, and the dedicated control PDSCH may include DCI for multiple UEs. This may reduce monitoring of PDCCH occasions and blind decoding of PDCCH candidates by UEs, leading to reduced power consumption for UEs.

Figure 4:
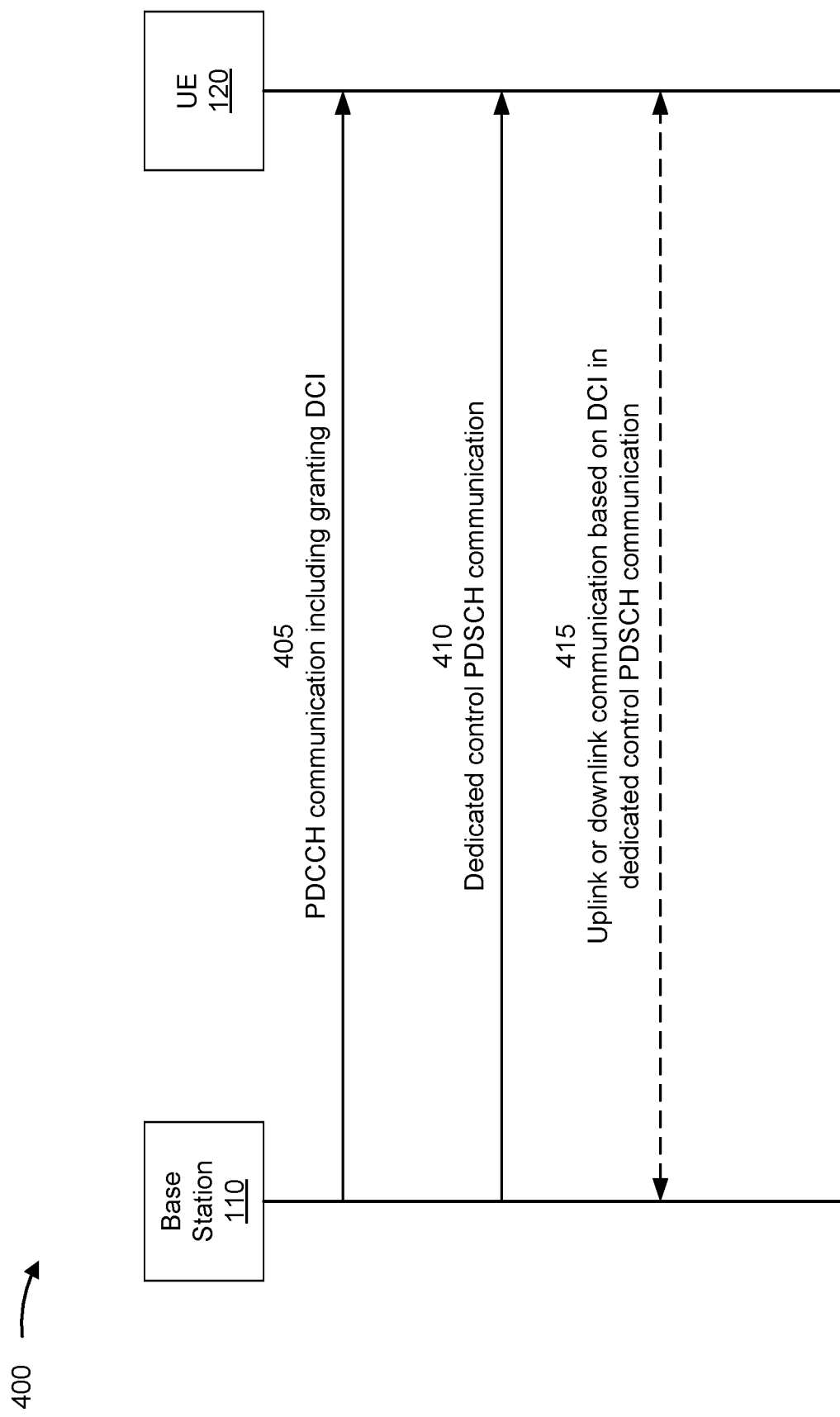
FIG. 4 is a diagram illustrating an example associated with a control physical downlink shared channel (PDSCH) for additional control capacity, in accordance with the present disclosure.

FIG. 4 is a diagram illustrating an example 400 associated with a control PDSCH for additional control capacity, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 4, and by reference number 405, the base station 110 may transmit a PDCCH communication including a granting DCI that grants resources for a dedicated control PDSCH communication. The granting DCI may also be referred to as "first DCI." The granting DCI may be DCI that schedules resources for the dedicated control PDSCH communication. In some aspects, the dedicated control PDSCH may be granted on demand. For example, the base station 110 may transmit the PDCCH communication including the granting DCI based at least in part on a determination, by the base station 110, that additional control capacity is needed.

In some aspects, the grant DCI may include a radio network temporary identifier (RNTI) that indicates a group of UEs to decode the dedicated control PDSCH communication. In some aspects, the PDCCH communication including the granting DCI may be transmitted in a common search space. For example, the PDCCH communication may be a type 3 PDCCH communication transmitted in the common search space. In some aspects, the PDCCH communication may be transmitted in a group-common search space and/or a UE-specific search space.

The UE 120 may receive the PDCCH communication. For example, the UE 120 may monitor the search space in which the PDCCH communication is transmitted, and the UE 120 may decode the PDCCH communication and receive the granting DCI. In some aspects, the UE 120 may be configured with the RNTI indicated in the granting DCI. For example, the RNTI may be associated with a group of UEs that includes the UE 120 and one or more other UEs.

In some aspects, the base station 110 may not support retransmission of the dedicated control PDSCH, and the granting DCI may not include hybrid automatic repeat request (HARQ) information relating to retransmission of the dedicated control PDSCH. In this case, the dedicated control PDSCH, that is granted by the granting DCI, may include DCI that is only valid if decoded on a first attempt. For example, an uplink or downlink grant scheduled by the DCI in the PDSCH may be dependent on the timing of when the PDSCH is received by the UE 120, and retransmission of the dedicated control PDSCH may cause ambiguity as to when the dedicated control PDSCH will be received by the UE 120.

In some aspects, the granting DCI may be transmitted in a DCI format associated with a downlink grant, such as DCI 1_0, DCI 1_1, or DCI 1_2. In this case, one or more fields in DCI format may be repurposed or hard coded to a particular value in the granting DCI. In some aspects, based at least in part on no retransmission of the dedicated control PDSCH, fields relating to HARQ information and/or retransmission of downlink data may be repurposed or hard coded to 0 (zero) for an additional parity check. For example, such fields may include a HARQ identifier (ID) field, a redundancy version ID (RVID) field, a new data indicator (NDI) field, a downlink assignment index (DAI) field, a physical uplink control channel (PUCCH) resource indicator (PRI) field, and/or a transmit power control (TPC) field. In some aspects, the grant DCI may utilize a DCI 1_0 format with a cyclic redundancy check (CRC) scrambled by a group RNTI (G-RNTI), and with the fields relating to HARQ information hard coded to 0 or repurposed.

The granting DCI may include fields that indicate resources and parameters for reception of the dedicated control PDSCH, for example, including a frequency domain resource assignment (FDRA), time domain resource assignment (TDRA), and MCS. The dedicated control PDSCH size may be dynamic, and the UE 120 may determine the transport block size (TBS) for the dedicated control PDSCH based at least in part on the granting DCI. In some aspects, the granting DCI may include a quick paging type hashing field for indicating a subset of UEs to decode the dedicated control PDSCH. For a particular UE, such as UE 120, the base station 110 may hash a UE ID for the UE 120 to a bit in the field, and set the bit to 1 if a DCI targeting the UE 120 is to be included on the dedicated control PDSCH. In this case, the UE 120 may skip decoding the dedicated control PDSCH if the bit associated with the UE ID of the UE 120 is not set to 1 in the granting PDSCH. This may result in power saving by the UE 120 in cases in which the DCI in the dedicated control PDSCH does not target the UE 120. In some aspects, one of the fields relating to HARQ information may be repurposed for the quick paging type hashing field.

In some aspects, the granting DCI may indicate a slot aggregation level for transmitting the dedicated control PDSCH. This may improve the coverage of the dedicated control PDSCH. In some aspects, the granting DCI may indicate an RRC configured aggregation level. In some aspects, the granting DCI may dynamically indicate the aggregation level as part of the TDRA.

As further shown in FIG. 4, and by reference number 410, the base station 110 may transmit the dedicated control PDSCH communication. The dedicated control PDSCH communication is a PDSCH communication dedicated for transmitting control information (e.g., DCI) to one or more UEs. The base station 110 may transmit the dedicated control PDSCH using the resources (e.g., FDRA, TDRA, and MCS) indicated in the granting DCI.

In some aspects, transmission of the dedicated control PDSCH by the base station 110 may be restricted to limit an impact on a capacity of the UE 120 to receive PDSCH data transmissions. In some aspects, transmission of the dedicated control PDSCH by the base station 110 may be restricted based at least in part on the base station 110 treating the dedicated control PDSCH as a broadcast PDSCH. The UE 120 may have a limited number of broadcast PDSCH communications that can be received by the UE 120 in a slot. For example, the UE 120 may be able to receive two broad PDSCH communications in a slot (e.g., budgeted for system information broadcasts and paging broadcasts). In this case, the dedicated control PDSCH is treated as a PDSCH broadcast, and the base station 110 may transmit the dedicated control PDSCH in a slot together with another PDSCH broadcast (e.g., a system information broadcast or a paging broadcast), but may not transmit the dedicated control PDSCH in the same slot as two other PDSCH broadcasts (e.g., a system information broadcast and a paging broadcast). In some aspects, transmission of the dedicated control PDSCH by the base station 110 may be restricted based at least in part on a TBS restriction, a rank restriction, a single codeword restriction, an MCS restriction, and/or a modulation order restriction (e.g., restricted to quadrature phase shift keying (QPSK) modulation).

The UE 120 may receive the dedicated control PDSCH communication transmitted by the base station 110 and decode the dedicated control PDSCH communication. The dedicated control PDSCH communication may include DCI targeting one or more UEs. The DCI may be transmitted in a payload of the dedicated control PDSCH communication. The DCI may be encoded using LDPC code in the payload of the dedicated control PDSCH communication.

In some aspects, the UE 120 may determine whether or not to decode the dedicated control PDSCH communication based on one or more indications in the granting DCI. In some aspects, the UE 120 may decode the dedicated control PDSCH communication based at least in part on a determination that an RNTI included in the granting DCI is associated with a group of UEs that includes the UE 120. In some aspects, the UE 120 may determine whether to decode the dedicated control PDSCH communication based at least in part on a determination of whether a bit associated with the UE ID of the UE 120 in a field of the granting DCI provides an indication that the dedicated control PDSCH communication included DCI that targets the UE 120.

In some aspects, the DCI included in the dedicated control PDSCH communication includes a plurality of component DCIs. For example, the component DCIs may be aggregated and jointly encoded in the dedicated control PDSCH communication. Each component DCI may be DCI associated with a respective UE of a plurality of UEs.

In some aspects, a physical layer structure may be used to carry the component DCIs. In some aspects, in the physical layer structure, each component DCI may include a UE ID field that indicates a UE ID of the respective UE that is associated with that component DCI. In some aspects, the component DCIs may have variable lengths. In such cases, each component DCI may include a DCI length field that indicates a length of that component DCI. The UE 120 may detect, from the plurality of component DCIs, the component DCI associated with the UE 120 based at least in part on the UE ID fields and the DCI length fields of the component DCIs.

In some aspects, each component DCI may be configured to have the same length. For example, the length of each component DCI may be configured via an RRC configuration. For DCI components that do not require the full length, extra fields may be set to zero. In this case, the UE 120 may detect the component DCI associated with the UE 120 based at least in part on the UE ID fields of the component DCIs.

In some aspects, medium access control (MAC) control elements (MAC-CEs) may be used to transmit the component DCIs. For example, each component DCI may be transmitted in a respective MAC-CE. Each MAC-CE may indicate the UE ID (or RNTI) of the UE that is associated with the component DCI carried by the MAC-CE. In some aspects, each MAC-CE may indicate a length of the MAC-CE in order to capture different lengths of component DCIs. Alternatively, the length of the MAC-CEs may be configured (e.g., via an RRC configuration) or hard coded, and extra fields in a MAC-CE can be set to 0.

In some aspects, the DCI component associated with the UE 120 may schedule an uplink grant or a downlink grant for the UE 120. In this case, a time offset (e.g., K0, K1, or K2) associated with the uplink grant or a downlink grant may begin at a last symbol of the dedicated control PDSCH communication. In some aspects, the processing timeline may also be adjusted based at least in part on a PDSCH processing time. For example, a fixed offset (e.g., configured via an RRC configuration) may be added in addition to the indicated time offset (e.g., K0, K1, or K2) in the DCI component.

For downlink grants, PDCCH location information may not be available for PUCCH hashing, as the DCI component is transmitted in the dedicated control PDSCH communication. In some aspects, rules may be configured for PUCCH hashing. For example, PUCCH hashing may use a fixed CCE index (e.g., configured via RRC), a record index of the component DCI in a DCI index in the dedicated control PDSCH communication, an explicit indication in the DCI in the dedicated control PDSCH communication, or a starting CCE of the granting DCI, among other examples.

As further shown in FIG. 4, and by reference number 415, the UE 120 may transmit an uplink communication or receive a downlink communication based at least in part on the DCI in the dedicated control PDSCH. In some aspects, the UE 120 may transmit an uplink communication scheduled in an uplink grant included in the DCI component associated with the UE 120. In some aspects, the UE 120 may receive a downlink communication scheduled in a downlink grant included in the DCI component associated with the UE 120.

As described above in connection with FIG. 4, the UE 120 may receive a PDCCH communication including first DCI that grants resources for a dedicated control PDSCH communication. The UE 120 may receive the dedicated control PDSCH, and the dedicated control PDSCH may include second DCI targeting the UE 120 one or more other UEs. The second DCI may be transmitted in the payload of the dedicated control PDSCH. As a result, a capacity for transmitting DCI may be increased. Furthermore, the second DCI may be encoded using low-density parity check (LDPC) code. Thus, decoding the second DCI may not be counted towards a control decoding capacity of a UE. Furthermore, resources for the dedicated control PDSCH are granted by the first DCI, and the dedicated control PDSCH may include DCI for multiple UEs. This may reduce monitoring of PDCCH occasions and blind decoding of PDCCH candidates by UEs, leading to reduced power consumption for UEs.

As indicated above, FIG. 4 is provided as an example. Other examples may differ from what is described with respect to FIG. 4.

Figure 5:
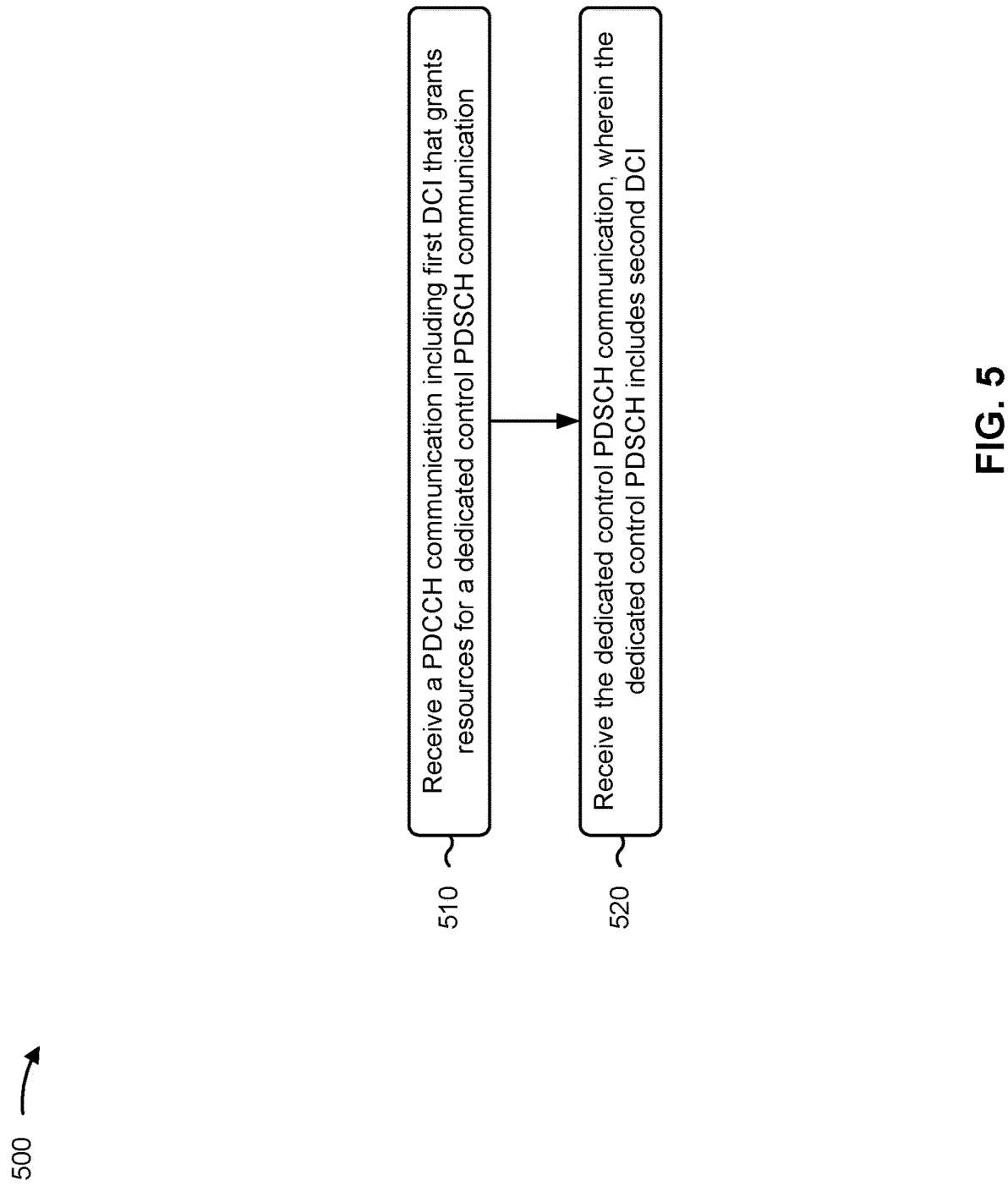
FIGS. 5-6 are diagrams illustrating example processes associated with a control PDSCH for additional control capacity, in accordance with the present disclosure.

FIG. 5 is a diagram illustrating an example process 500 performed, for example, by a UE, in accordance with the present disclosure. Example process 500 is an example where the UE (e.g., UE 120) performs operations associated with a control PDSCH for additional control capacity.

As shown in FIG. 5, in some aspects, process 500 may include receiving a PDCCH communication including first DCI that grants resources for a dedicated control PDSCH communication (block 510). For example, the UE (e.g., using reception component 702, depicted in FIG. 7) may receive a PDCCH communication including first DCI that grants resources for a dedicated control PDSCH communication, as described above.

As further shown in FIG. 5, in some aspects, process 500 may include receiving the dedicated control PDSCH communication, wherein the dedicated control PDSCH includes second DCI (block 520). For example, the UE (e.g., using reception component 702, depicted in FIG. 7) may receive the dedicated control PDSCH communication, wherein the dedicated control PDSCH includes second DCI, as described above.

Process 500 may include additional aspects, such as any single aspect or any combination of aspects described below and/or in connection with one or more other processes described elsewhere herein.

In a first aspect, the second DCI is transmitted using LDPC code in a payload of the dedicated control PDSCH communication.

In a second aspect, alone or in combination with the first aspect, the PDCCH communication is a type 3 PDCCH communication carried in a common search space.

In a third aspect, alone or in combination with one or more of the first and second aspects, the first DCI indicates an RNTI, and process 500 includes decoding the dedicated control PDSCH communication based at least in part on determining that the RNTI is associated with a group of UEs that includes the UE.

In a fourth aspect, alone or in combination with one or more of the first through third aspects, the first DCI does not include hybrid automatic repeat request information relating to retransmission of the dedicated control PDSCH communication.

In a fifth aspect, alone or in combination with one or more of the first through fourth aspects, the first DCI includes, in a bit associated with a UE identifier of the UE, an indication that the second DCI targets the UE, and process 500 further includes decoding the dedicated control PDSCH communication based at least in part on the indication in the bit associated with the UE identifier of the UE.

In a sixth aspect, alone or in combination with one or more of the first through fifth aspects, the first DCI indicates a slot aggregation level for transmission of the dedicated control PDSCH.

In a seventh aspect, alone or in combination with one or more of the first through sixth aspects, transmission of the dedicated control PDSCH by a base station is restricted based on treating the dedicated control PDSCH as a broadcast PDSCH.

In an eighth aspect, alone or in combination with one or more of the first through seventh aspects, the second DCI includes a plurality of component DCIs each associated with a respective one of a plurality of UEs.

In a ninth aspect, alone or in combination with one or more of the first through eighth aspects, each component DCI, of the plurality of component DCIs, includes a UE identifier field that indicates a UE identifier of the respective one of the plurality of UEs associated with that component DCI and a DCI length field that indicates a length of that component DCI, and process 500 further includes detecting, from the plurality of component DCIs, a component DCI associated with the UE based at least in part on the UE identifier field and the DCI length field of the component DCI associated with the UE.

In a tenth aspect, alone or in combination with one or more of the first through ninth aspects, the plurality of component DCIs are configured to have a same length, and each component DCI, of the plurality of component DCIs, includes a UE identifier field that indicates a UE identifier of the respective one of the plurality of UEs associated with that component DCI, and process 500 further includes detecting, from the plurality of component DCIs, a component DCI associated with the UE based at least in part on the UE identifier field of the component DCI associated with the UE.

In an eleventh aspect, alone or in combination with one or more of the first through tenth aspects, each component DCI of the plurality of component DCIs is transmitted in a respective MAC-CE that includes an indication of a UE identifier of the respective one of the plurality of UEs associated with that component DCI.

In a twelfth aspect, alone or in combination with one or more of the first through eleventh aspects, a component DCI, of the plurality of component DCIs, that is associated with the UE schedules an uplink grant or a downlink grant for the UE, and a time offset associated with the uplink grant or a downlink grant begins at a last symbol of the dedicated control PDSCH communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:

FIG. 6 is a diagram illustrating an example process 600 performed, for example, by a base station, in accordance with the present disclosure. Example process 600 is an example where the base station (e.g., base station 110) performs operations associated with a control PDSCH for additional control capacity.

As shown in FIG. 6, in some aspects, process 600 may include transmitting a PDCCH communication including first DCI that grants resources for a dedicated control PDSCH communication (block 610). For example, the base station (e.g., using transmission component 804, depicted in FIG. 8) may transmit a PDCCH communication including first DCI that grants resources for a dedicated control PDSCH communication, as described above.

As further shown in FIG. 6, in some aspects, process 600 may include transmitting the dedicated control PDSCH communication, wherein the dedicated control PDSCH includes second DCI (block 620). For example, the base station (e.g., using transmission component 804, depicted in FIG. 8) may transmit the dedicated control PDSCH communication, wherein the dedicated control PDSCH includes second DCI, as described above.

Process 600 may include additional aspects, such as any single aspect or any combination of aspects described below and/or in connection with one or more other processes described elsewhere herein.

In a first aspect, the second DCI is transmitted using LDPC code in a payload of the dedicated control PDSCH communication.

In a second aspect, alone or in combination with the first aspect, the PDCCH communication is a type 3 PDCCH communication carried in a common search space.

In a third aspect, alone or in combination with one or more of the first and second aspects, the first DCI does not include hybrid automatic repeat request information relating to retransmission of the dedicated control PDSCH communication.

In a fourth aspect, alone or in combination with one or more of the first through third aspects, transmission of the dedicated control PDSCH by a base station is restricted based on treating the dedicated control PDSCH as a broadcast PDSCH.

In a fifth aspect, alone or in combination with one or more of the first through fourth aspects, the second DCI includes a plurality of component DCIs each associated with a respective one of a plurality of UEs.

In a sixth aspect, alone or in combination with one or more of the first through fifth aspects, each component DCI, of the plurality of component DCIs, includes a UE identifier field that indicates a UE identifier of the respective one of the plurality of UEs associated with that component DCI and a DCI length field that indicates a length of that component DCI.

In a seventh aspect, alone or in combination with one or more of the first through sixth aspects, each component DCI of the plurality of component DCIs is transmitted in a respective MAC-CE that includes an indication of a UE identifier of the respective one of the plurality of UEs associated with that component DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
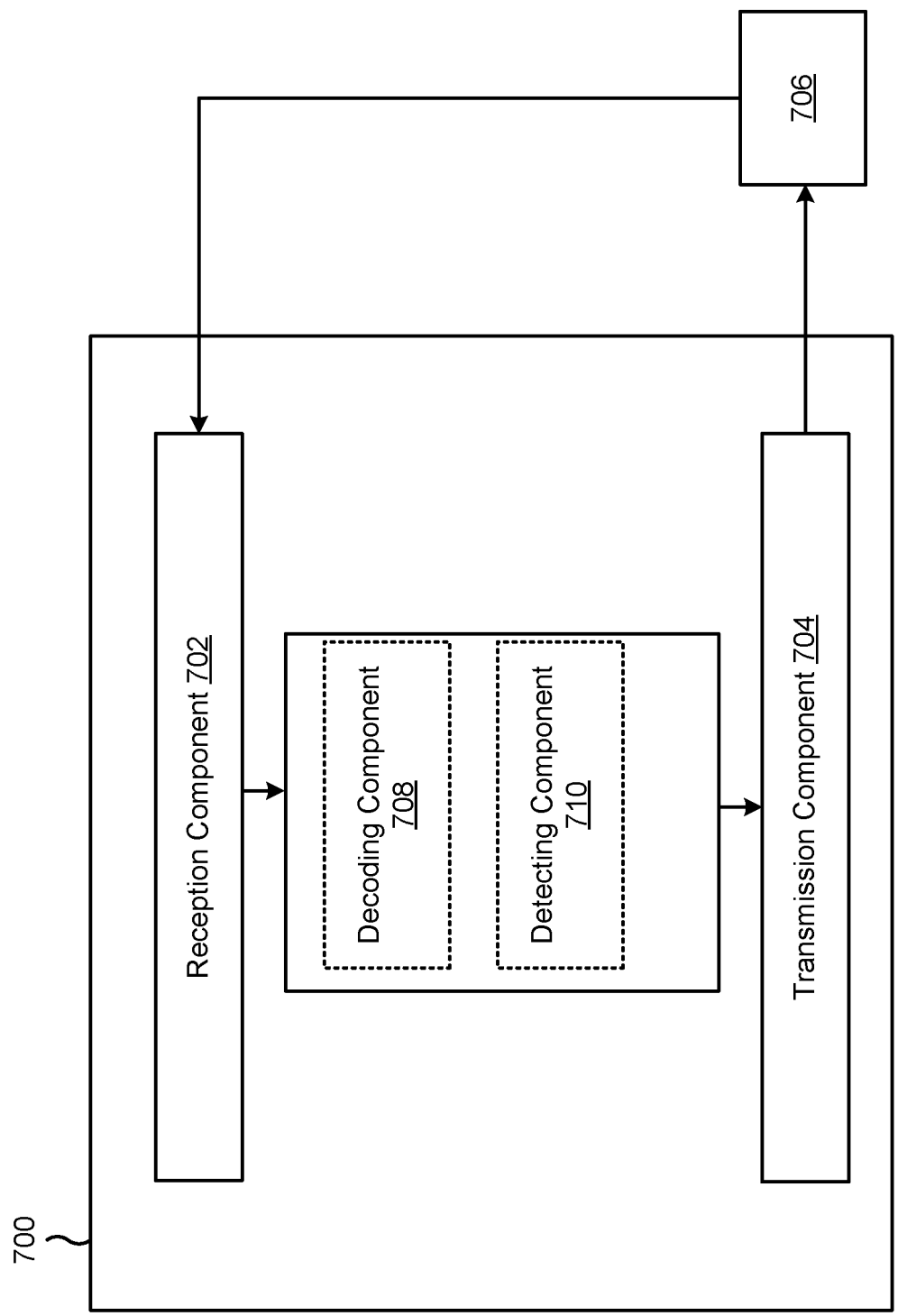
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a decoding component 708 or a detecting component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive a PDCCH communication including first DCI that grants resources for a dedicated control PDSCH communication. The reception component 702 may receive the dedicated control PDSCH communication, wherein the dedicated control PDSCH includes second DCI.

The decoding component 708 may decode the dedicated control PDSCH communication.

The detection component 710 may detect, from a plurality of DCI components, a DCI component associated with the UE.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
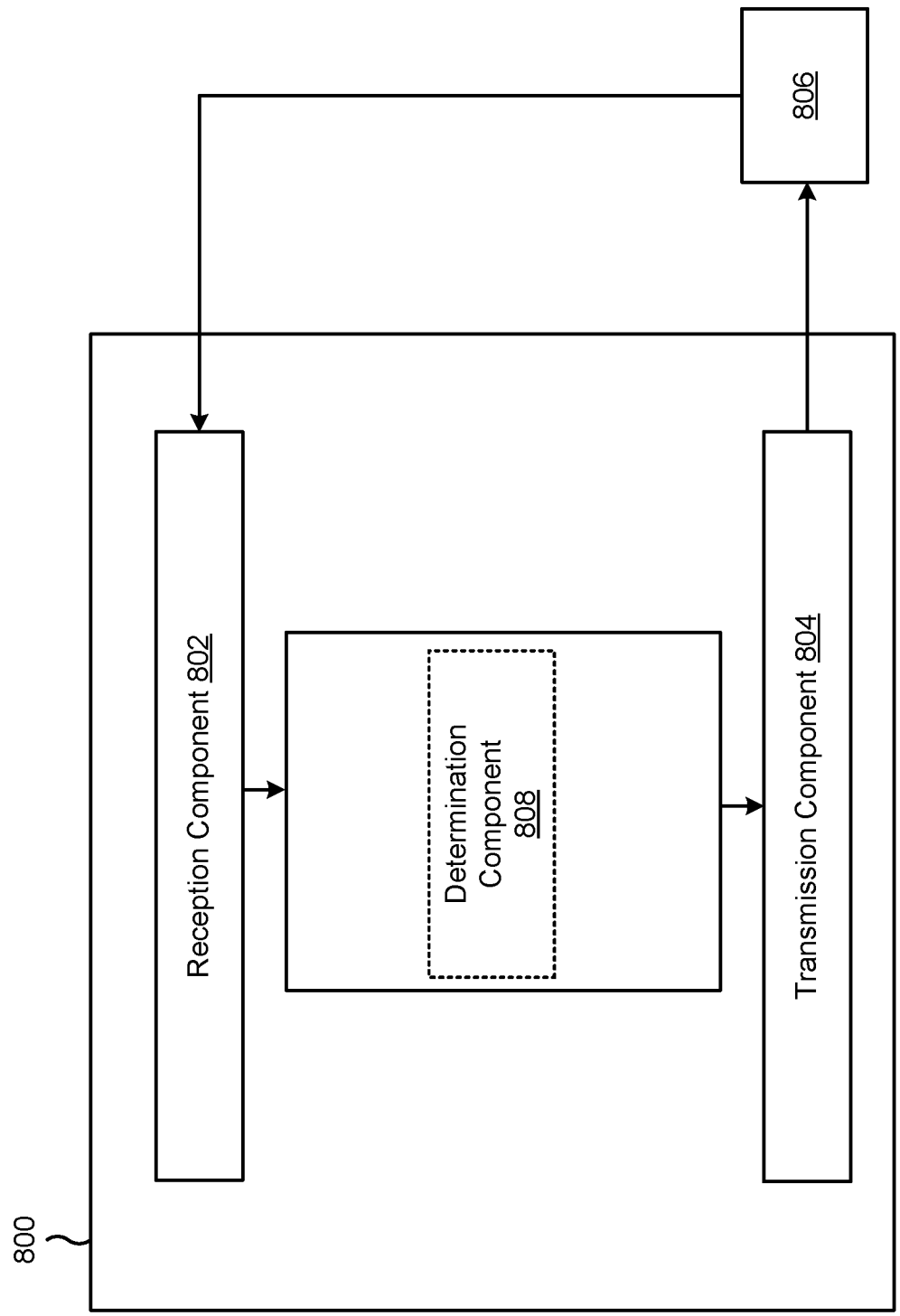

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit a PDCCH communication including first DCI that grants resources for a dedicated control PDSCH communication. The transmission component 804 may transmit the dedicated control PDSCH communication, wherein the dedicated control PDSCH includes second DCI. The determination component 808 may determine the resources for the dedicated control PDSCH.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a physical downlink control channel (PDCCH) communication including first downlink control information (DCI) that grants resources for a dedicated control physical downlink shared channel (PDSCH) communication; and receiving the dedicated control PDSCH communication, wherein the dedicated control PDSCH includes second DCI.

Aspect 2: The method of Aspect 1, wherein the second DCI is transmitted using low-density parity-check (LDPC) code in a payload of the dedicated control PDSCH communication.

Aspect 3: The method of any of Aspects 1-2, wherein the PDCCH communication is a type 3 PDCCH communication carried in a common search space.

Aspect 4: The method of any of Aspects 1-3, wherein the first DCI indicates a radio network temporary identifier (RNTI), and further comprising: decoding the dedicated control PDSCH communication based at least in part on determining that the RNTI is associated with a group of UEs that includes the UE.

Aspect 5: The method of any of Aspects 1-4, wherein the first DCI does not include hybrid automatic repeat request information relating to retransmission of the dedicated control PDSCH communication.

Aspect 6: The method of any of Aspects 1-5, wherein the first DCI includes, in a bit associated with a UE identifier of the UE, an indication that the second DCI targets the UE, and further comprising: decoding the dedicated control PDSCH communication based at least in part on the indication in the bit associated with the UE identifier of the UE.

Aspect 7: The method of any of Aspects 1-6, wherein the first DCI indicates a slot aggregation level for transmission of the dedicated control PDSCH.

Aspect 8: The method of any of Aspects 1-7, wherein transmission of the dedicated control PDSCH by a base station is restricted based on treating the dedicated control PDSCH as a broadcast PDSCH.

Aspect 9: The method of any of Aspects 1-8, wherein the second DCI includes a plurality of component DCIs each associated with a respective one of a plurality of UEs.

Aspect 10: The method of Aspect 9, wherein each component DCI, of the plurality of component DCIs, includes a UE identifier field that indicates a UE identifier of the respective one of the plurality of UEs associated with that component DCI and a DCI length field that indicates a length of that component DCI, and further comprising: detecting, from the plurality of component DCIs, a component DCI associated with the UE based at least in part on the UE identifier field and the DCI length field of the component DCI associated with the UE.

Aspect 11: The method of Aspect 9, wherein the plurality of component DCIs are configured to have a same length, and each component DCI, of the plurality of component DCIs, includes a UE identifier field that indicates a UE identifier of the respective one of the plurality of UEs associated with that component DCI, and further comprising: detecting, from the plurality of component DCIs, a component DCI associated with the UE based at least in part on the UE identifier field of the component DCI associated with the UE.

Aspect 12: The method of Aspect 9, wherein each component DCI of the plurality of component DCIs is transmitted in a respective medium access control (MAC) control element that includes an indication of a UE identifier of the respective one of the plurality of UEs associated with that component DCI.

Aspect 13: The method of any of Aspects 9-12, wherein a component DCI, of the plurality of component DCIs, that is associated with the UE schedules an uplink grant or a downlink grant for the UE, and wherein a time offset associated with the uplink grant or a downlink grant begins at a last symbol of the dedicated control PDSCH communication.

Aspect 14: A method of wireless communication performed by a base station, comprising: transmitting a physical downlink control channel (PDCCH) communication including first downlink control information (DCI) that grants resources for a dedicated control physical downlink shared channel (PDSCH) communication; and transmitting the dedicated control PDSCH communication, wherein the dedicated control PDSCH includes second DCI.

Aspect 15: The method of Aspect 14, wherein the second DCI is transmitted using low-density parity-check (LDPC) code in a payload of the dedicated control PDSCH communication.

Aspect 16: The method of any of Aspects 14-15, wherein the PDCCH communication is a type 3 PDCCH communication carried in a common search space.

Aspect 17: The method of any of Aspects 14-16, wherein the first DCI does not include hybrid automatic repeat request information relating to retransmission of the dedicated control PDSCH communication.

Aspect 18: The method of any of Aspects 14-17, wherein transmission of the dedicated control PDSCH by a base station is restricted based on treating the dedicated control PDSCH as a broadcast PDSCH.

Aspect 19: The method of any of Aspects 14-18, wherein the second DCI includes a plurality of component DCIs each associated with a respective one of a plurality of UEs.

Aspect 20: The method of Aspect 19, wherein each component DCI, of the plurality of component DCIs, includes a UE identifier field that indicates a UE identifier of the respective one of the plurality of UEs associated with that component DCI and a DCI length field that indicates a length of that component DCI.

Aspect 21: The method of Aspect 19, wherein each component DCI of the plurality of component DCIs is transmitted in a respective medium access control (MAC) control element that includes an indication of a UE identifier of the respective one of the plurality of UEs associated with that component DCI.

Aspect 22: An apparatus for wireless communication at a device, comprising a processor; memory coupled with the processor; and instructions stored in the memory and executable by the processor to cause the apparatus to perform the method of one or more Aspects of Aspects 1-13.

Aspect 23: An apparatus for wireless communication at a device, comprising a processor; memory coupled with the processor; and instructions stored in the memory and executable by the processor to cause the apparatus to perform the method of one or more Aspects of Aspects 14-21.

Aspect 24: A device for wireless communication, comprising a memory and one or more processors coupled to the memory, the memory and the one or more processors configured to perform the method of one or more Aspects of Aspects 1-13.

Aspect 25: A device for wireless communication, comprising a memory and one or more processors coupled to the memory, the memory and the one or more processors configured to perform the method of one or more Aspects of Aspects 14-21.

Aspect 26: An apparatus for wireless communication, comprising at least one means for performing the method of one or more Aspects of Aspects 1-13.

Aspect 27: An apparatus for wireless communication, comprising at least one means for performing the method of one or more Aspects of Aspects 14-21.

Aspect 28: A non-transitory computer-readable medium storing code for wireless communication, the code comprising instructions executable by a processor to perform the method of one or more Aspects of Aspects 1-13.

Aspect 29: A non-transitory computer-readable medium storing code for wireless communication, the code comprising instructions executable by a processor to perform the method of one or more Aspects of Aspects 14-21.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 14-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a physical downlink control channel (PDCCH) communication including first downlink control information (DCI) that grants resources for a dedicated control physical downlink shared channel (PDSCH) communication; and
    receiving, as a broadcast PDSCH, the dedicated control PDSCH communication, wherein the dedicated control PDSCH communication includes second DCI, the second DCI including a plurality of component DCIs each associated with a respective one of a plurality of UEs.

2. The method of claim 1, wherein the second DCI is transmitted using low-density parity-check (LDPC) code in a payload of the dedicated control PDSCH communication.

3. The method of claim 1, wherein the PDCCH communication is a type 3 PDCCH communication carried in a common search space.

4. The method of claim 1, wherein the first DCI indicates a radio network temporary identifier (RNTI), and further comprising:
    decoding the dedicated control PDSCH communication based at least in part on determining that the RNTI is associated with a group of user equipments that includes the UE.

5. The method of claim 1, wherein the first DCI does not include hybrid automatic repeat request information relating to retransmission of the dedicated control PDSCH communication.

6. The method of claim 1, wherein the first DCI includes, in a bit associated with a UE identifier of the UE, an indication that the second DCI targets the UE, and further comprising:
    decoding the dedicated control PDSCH communication based at least in part on the indication in the bit associated with the UE identifier of the UE.

7. The method of claim 1, wherein the first DCI indicates a slot aggregation level for transmission of the dedicated control PDSCH communication.

8. The method of claim 1, wherein transmission of the dedicated control PDSCH communication is restricted based on the dedicated control PDSCH communication being treated as a broadcast PDSCH.

9. The method of claim 8, wherein reception of the dedicated control PDSCH communication is based on a limited number of broadcast PDSCH communications in a slot the UE is configured to receive.

10. The method of claim 1, wherein each component DCI, of the plurality of component DCIs, includes a UE identifier field that indicates a UE identifier of the respective one of the plurality of UEs associated with that component DCI and a DCI length field that indicates a length of that component DCI, and further comprising:
   detecting, from the plurality of component DCIs, a component DCI associated with the UE based at least in part on the UE identifier field and the DCI length field of the component DCI associated with the UE.

11. The method of claim 1, wherein the plurality of component DCIs are configured to have a same length, and each component DCI, of the plurality of component DCIs, includes a UE identifier field that indicates a UE identifier of the respective one of the plurality of UEs associated with that component DCI, and further comprising:
   detecting, from the plurality of component DCIs, a component DCI associated with the UE based at least in part on the UE identifier field of the component DCI associated with the UE.

12. The method of claim 1, wherein each component DCI of the plurality of component DCIs is transmitted in a respective medium access control (MAC) control element that includes an indication of a UE identifier of the respective one of the plurality of UEs associated with that component DCI.

13. The method of claim 1, wherein a component DCI, of the plurality of component DCIs, that is associated with the UE schedules an uplink grant or a downlink grant for the UE, and wherein a time offset associated with the uplink grant or a downlink grant begins at a last symbol of the dedicated control PDSCH communication.

14. A method of wireless communication performed by a base station, comprising:
   transmitting a physical downlink control channel (PDCCH) communication including first downlink control information (DCI) that grants resources for a dedicated control physical downlink shared channel (PDSCH) communication; and
   transmitting, as a broadcast PDSCH, the dedicated control PDSCH communication, wherein the dedicated control PDSCH communication includes second DCI, the second DCI including a plurality of component DCIs each associated with a respective one of a plurality of user equipments (UEs).

15. The method of claim 14, wherein the second DCI is transmitted using low-density parity-check (LDPC) code in a payload of the dedicated control PDSCH communication.

16. The method of claim 14, wherein the PDCCH communication is a type 3 PDCCH communication carried in a common search space.

17. The method of claim 14, wherein the first DCI does not include hybrid automatic repeat request information relating to retransmission of the dedicated control PDSCH communication.

18. The method of claim 14, wherein transmission of the dedicated control PDSCH communication is restricted based on the dedicated control PDSCH communication being treated as a broadcast PDSCH.

19. The method of claim 18, wherein transmission of the dedicated control PDSCH communication is based on a limited number of broadcast PDSCH communications in a slot one or more of the UEs are configured to receive.

20. The method of claim 14, wherein each component DCI, of the plurality of component DCIs, includes a UE identifier field that indicates a UE identifier of the respective one of the plurality of UEs associated with that component DCI and a DCI length field that indicates a length of that component DCI.

21. The method of claim 14, wherein each component DCI of the plurality of component DCIs is transmitted in a respective medium access control (MAC) control element that includes an indication of a UE identifier of the respective one of the plurality of UEs associated with that component DCI.

22. A user equipment (UE) for wireless communication, comprising:
   a memory; and
   one or more processors coupled to the memory, the one or more processors configured to:
      receive a physical downlink control channel (PDCCH) communication including first downlink control information (DCI) that grants resources for a dedicated control physical downlink shared channel (PDSCH) communication; and
      receive, as a broadcast PDSCH, the dedicated control PDSCH communication, wherein the dedicated control PDSCH communication includes second DCI, the second DCI including a plurality of component DCIs each associated with a respective one of a plurality of UEs.

23. The UE of claim 22, wherein the second DCI is transmitted using low-density parity-check (LDPC) code in a payload of the dedicated control PDSCH communication.

24. The UE of claim 22, wherein each component DCI, of the plurality of component DCIs, includes a UE identifier field that indicates a UE identifier of the respective one of the plurality of UEs associated with that component DCI and a DCI length field that indicates a length of that component DCI, and the one or more processors are further configured to:
   detect, from the plurality of component DCIs, a component DCI associated with the UE based at least in part on the UE identifier field and the DCI length field of the component DCI associated with the UE.

25. The UE of claim 22, wherein each component DCI of the plurality of component DCIs is transmitted in a respective medium access control (MAC) control element that includes an indication of a UE identifier of the respective one of the plurality of UEs associated with that component DCI.

26. The UE of claim 22, wherein reception of the dedicated control PDSCH communication is based on a limited number of broadcast PDSCH communications in a slot the UE is configured to receive.

27. A base station for wireless communication, comprising:
   a memory; and
   one or more processors coupled to the memory, the one or more processors configured to:
   transmit a physical downlink control channel (PDCCH) communication including first downlink control information (DCI) that grants resources for a dedicated control physical downlink shared channel (PDSCH) communication; and transmit, as a broadcast PDSCH, the dedicated control PDSCH communication, wherein the dedicated control PDSCH communication includes second DCI, the second DCI including a plurality of component DCIs each associated with a respective one of a plurality of user equipments (UEs).

28. The base station of claim 27, wherein each component DCI, of the plurality of component DCIs, includes a UE identifier field that indicates a UE identifier of the respective one of the plurality of UEs associated with that component DCI and a DCI length field that indicates a length of that component DCI.

29. The base station of claim 27, wherein each component DCI of the plurality of component DCIs is transmitted in a respective medium access control (MAC) control element that includes an indication of a UE identifier of the respective one of the plurality of UEs associated with that component DCI.

30. The base station of claim 27, wherein transmission of the dedicated control PDSCH communication is based on a limited number of broadcast PDSCH communications in a slot one or more of the UEs are configured to receive.

* * * * *